(12) United States Patent
Kim et al.

(10) Patent No.: US 12,547,368 B2
(45) Date of Patent: Feb. 10, 2026

(54) SOUND SYSTEM USING OVER-THE-AIR AND OPERATION METHOD THEREOF

(71) Applicants: Hyundai Motor Company, Seoul (KR); Kia Corporation, Seoul (KR)

(72) Inventors: Ki Chang Kim, Suwon-si (KR); Dong Chul Park, Anyang-si (KR); Eun Soo Jo, Hwaseong-si (KR); Sang Jin Hong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 388 days.

(21) Appl. No.: 18/189,514

(22) Filed: Mar. 24, 2023

(65) Prior Publication Data

US 2024/0160400 A1 May 16, 2024

(30) Foreign Application Priority Data

Nov. 16, 2022 (KR) .......................... 10-2022-0153740

(51) Int. Cl.
*G06F 3/16* (2006.01)
*B60R 25/24* (2013.01)
*G10K 15/04* (2006.01)

(52) U.S. Cl.
CPC ............ *G06F 3/165* (2013.01); *B60R 25/241* (2013.01); *G10K 15/04* (2013.01)

(58) Field of Classification Search
CPC ........ G06F 3/165; B60R 25/241; G10K 15/04
See application file for complete search history.

(56) References Cited

U.S. PATENT DOCUMENTS

| | | | |
|---|---|---|---|
| 8,520,872 B2 | 8/2013 | Jang et al. | |
| 2004/0090950 A1* | 5/2004 | Lauber | H04Q 9/00 370/352 |
| 2009/0034750 A1* | 2/2009 | Ayoub | G10L 25/69 704/E15.001 |
| 2010/0040238 A1 | 2/2010 | Jang et al. | |
| 2021/0365493 A1 | 11/2021 | Spahr et al. | |
| 2023/0153094 A1* | 5/2023 | Cain, Jr. | H04L 67/1097 717/168 |

FOREIGN PATENT DOCUMENTS

| | | | |
|---|---|---|---|
| KR | 101576294 B1 | 12/2015 | |
| KR | 102199567 B1 | 1/2021 | |

(Continued)

*Primary Examiner* — Joseph Saunders, Jr.
(74) *Attorney, Agent, or Firm* — Slater Matsil, LLP

(57) ABSTRACT

In a sound system that uses over-the-air (OTA), a blockchain platform server is configured to support performance of a virtual sound transaction in a virtual environment. An OTA server is configured to manage a virtual sound transmitted from the blockchain platform server. A vehicle communication control device is configured to perform wireless communication with the OTA server. The vehicle communication control device is configured to download the virtual sound from the OTA server, determine whether the virtual sound is similar to a predetermined specific sound, perform an OTA state test of the virtual sound when the virtual sound is not similar to the predetermined specific sound, and control a sound processing device to play the virtual sound when the virtual sound passes the OTA state test.

20 Claims, 12 Drawing Sheets

(56) References Cited

FOREIGN PATENT DOCUMENTS

| | | |
|---|---|---|
| KR | 102322511 B1 | 11/2021 |
| KR | 102340588 B1 | 12/2021 |
| KR | 102343025 B1 | 12/2021 |
| KR | 102345424 B1 | 12/2021 |
| KR | 20220027408 A | 3/2022 |

* cited by examiner

SOUND SYSTEM USING OVER-THE-AIR AND OPERATION METHOD THEREOF

CROSS-REFERENCE TO RELATED APPLICATIONS

This application claims the benefit of priority to Korean Patent Application No. 10-2022-0153740, filed in the Korean Intellectual Property Office on Nov. 16, 2022, the entire contents of which are incorporated herein by reference.

TECHNICAL FIELD

The present disclosure relates to a sound system using over-the-air (OTA) and an operation method thereof.

BACKGROUND

A non-fungible token (NFT) refers to a virtual token which proves ownership of digital assets (e.g., content such as drawings, photos, sound sources, images, or videos) using a blockchain technology. In other words, the NFT is a digital token to which the blockchain technology is applied, which contains a unique recognition value SUMMARY Embodiments of the present disclosure relates to a sound system using over-the-air (OTA) for tuning a virtual sound in a non-fungible token (NFT) blockchain-based virtual environment and an operation method thereof.

Embodiments of the present disclosure has been made to solve the above-mentioned problems occurring in the prior art while advantages achieved by the prior art are maintained intact.

An embodiment of the present disclosure provides a sound system using OTA for tuning a virtual sound in an NFT blockchain-based virtual environment and an operation method thereof.

Another embodiment of the present disclosure provides a sound system using OTA for connecting a virtual sound in an NFT blockchain-based virtual environment with a real world using the OTA to control the virtual sound and an operation method thereof.

Another embodiment of the present disclosure provides a sound system using OTA for checking a transaction for a virtual sound based on the OTA and verifying the virtual sound through an OTA state test in a vehicle environment and an operation method thereof.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, a sound system using OTA may include a blockchain platform server that supports to perform a virtual sound transaction in a virtual environment, an OTA server that manages a virtual sound transmitted from the blockchain platform server, and a vehicle communication control device that performs wireless communication with the OTA server. The vehicle communication control device may download the virtual sound from the OTA server, may determine whether the virtual sound is similar to a predetermined specific sound, may perform an OTA state test of the virtual sound, when the virtual sound is not similar to the predetermined specific sound, and may control a sound processing device to play the virtual sound, when the virtual sound passes the OTA state test.

The blockchain platform server may check a system of the blockchain platform server using an OTA simulator, may check a cryptocurrency transaction for the virtual sound using a metamask, when there is no abnormality in the system, may determine whether an abnormal transaction request and an iterative attack signal are detected in a process of performing the cryptocurrency transaction, may approve the cryptocurrency transaction, when it is determined that the abnormal transaction request and the iterative attack signal are not detected in the process of performing the cryptocurrency transaction, may perform output control and file format conversion of the virtual sound, the cryptocurrency transaction of which is approved, and may transmit the virtual sound, a file format of which is converted, to the OTA server.

The blockchain platform server may perform ID assignment, token generation, and a data error check using the OTA simulator and may identify whether the abnormal transaction request and the iterative attack signal are detected.

The blockchain platform server may convert a file format of the virtual sound into a pulse code modulation (PCM) file.

The predetermined specific sound may include at least one of a vehicle regulation sound or a warning sound.

The vehicle communication control device may perform at least one of an OTA scenario test, an OTA malice condition test, an OTA aging test, or a combination thereof.

The vehicle communication control device may reset a modem, when the virtual sound does not pass the OTA state test.

The vehicle communication control device may turn off an OTA-based sound playback function, when the virtual sound is similar to the predetermined specific sound.

The sound processing device may adjust at least one of volume of the virtual sound, timbre of the virtual sound, a sound output time point of the virtual sound, or a combination thereof based on at least one of an internal input signal parameter, an external input signal parameter, or a combination thereof obtained by a detection device included in the sound processing device.

According to another embodiment of the present disclosure, an operation method of a sound system using OTA may include transmitting, by a blockchain platform server, a virtual sound in a virtual environment to an OTA server, downloading, by a vehicle communication control device, the virtual sound from the OTA server, determining, by the vehicle communication control device, whether the virtual sound is similar to a predetermined specific sound, performing, by the vehicle communication control device, an OTA state test of the virtual sound, when the virtual sound is not similar to the predetermined specific sound, and controlling, by the vehicle communication control device, a sound processing device to play the virtual sound, when the virtual sound passes the OTA state test.

The transmitting of the virtual sound to the OTA server may include checking, by the blockchain platform server, a system of the blockchain platform server using an OTA simulator, checking, by the blockchain platform server, a cryptocurrency transaction for the virtual sound using a metamask, when there is no abnormality in the system, determining, by the blockchain platform server, whether an abnormal transaction request and an iterative attack signal are detected in a process of performing the cryptocurrency transaction, approving, by the blockchain platform server, the cryptocurrency transaction, when it is determined that the abnormal transaction request and the iterative attack signal are not detected in the process of performing the cryptocurrency transaction, performing, by the blockchain platform server, output control and file format conversion of the virtual sound, the cryptocurrency transaction of which is approved, and transmitting, by the blockchain platform server, the virtual sound, a file format of which is converted, to the OTA server.

The checking of the system may include performing, by the blockchain platform server, ID assignment, token generation, and a data error check using the OTA simulator and identifying, by the blockchain platform server, whether the abnormal transaction request and the iterative attack signal are detected.

The performing of the file format conversion may include converting, by the blockchain platform server, a file format of the virtual sound into a PCM file.

The performing of the OTA state test may include performing, by the vehicle communication control device, at least one of an OTA scenario test, an OTA malice condition test, an OTA aging test, or a combination thereof.

The operation method may further include resetting, by the vehicle communication control device, a modem, when the virtual sound does not pass the OTA state test.

The operation method may further include turning off, by the vehicle communication control device, an OTA-based sound playback function, when the virtual sound is similar to the predetermined specific sound.

The operation method may further include obtaining, by the sound processing device, at least one parameter among an internal input signal parameter, an external input signal parameter, and a combination thereof by means of a detection device included in the sound processing device and adjusting, by the sound processing device, at least one of volume of the virtual sound, timbre of the virtual sound, a sound output time point of the virtual sound, or a combination thereof based on the at least one obtained parameter.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
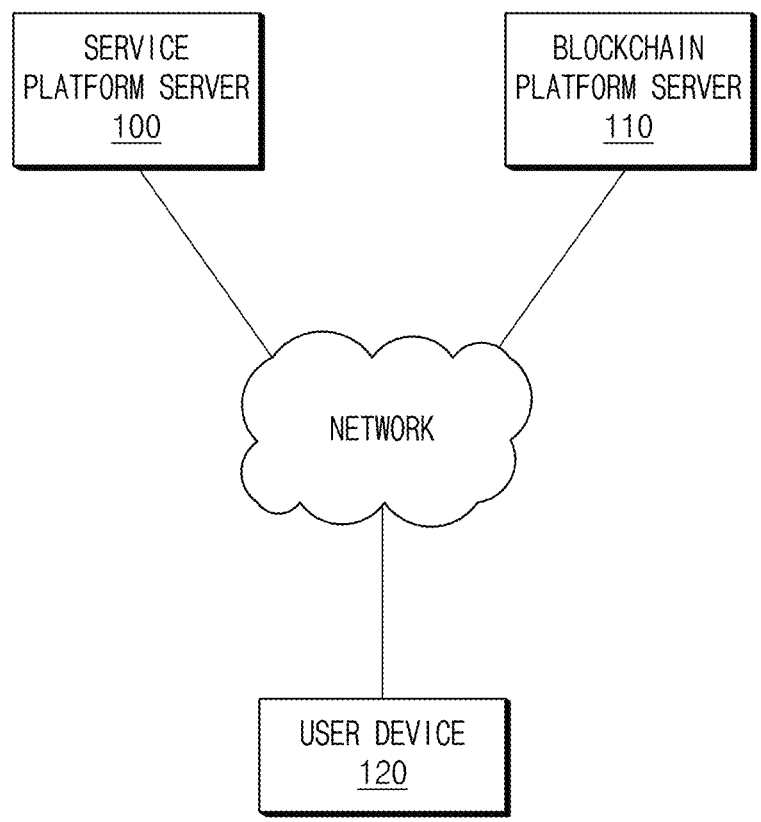
FIG. 1 is a block diagram illustrating a configuration of a system for providing a vehicle content service platform according to embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Over-the-air (OTA) is a wireless software update technology, which is emerging as a key technology in the fields of smartphone and automobile. There are following effects as the OTA is applied to vehicles. First, software costs may be reduced, and rapid response to recall and real-time notification, approval, and update are possible without visiting a service center. Secondly, it is possible to respond to customer's emotional quality and improve marketability by applying a new technology. A concept technology which loads a virtual environment sound design sound source into a personalized vehicle in the real world may be applied by devising a business model which connects the virtual environment with the real world. The utilization of technology is great through horizontal deployment in the fields of body, chassis, design, and infotainment. Finally, to solve security and bug problems, procedures such as state identification, approval, and update verification are performed through an OTA server to defend against or prevent malicious attacks. Furthermore, it is a model capable of quickly updating a vaccine program through OTA, minimizing damage to consumers, increasing the reliability of automobile manufacturers, and generating profits through it.

FIG. 1 is a block diagram illustrating a configuration of a system for providing a vehicle content service platform according to embodiments of the present disclosure.

Referring to FIG. 1, the system for providing the vehicle content service platform may include a service platform server 100, a blockchain platform server 110, and a user device 120, which are connected with one another over a wired and/or wireless network. Each of the service platform server 100, the blockchain platform server 110, and the user device 120 may include at least one processor, a memory, a communication circuit, and the like. The at least one processor may include at least one of processing devices such as an application specific integrated circuit (ASIC), a digital signal processor (DSP), a programmable logic device (PLD), a field programmable gate array (FPGA), a central processing unit (CPU), a microcontroller, or a microprocessor. The memory may be a non-transitory storage medium which stores instructions executed by the at least one processor. The memory may be implemented as at least one of storage media (recording media) such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), a removable disk, or web storage. The communication circuit may support communication among the service platform server 100, the blockchain platform server 110, and the user device 120. The communication circuit may include an OTA communication circuit, a wireless communication circuit (e.g., a long term evolution (LTE)) communication circuit, a short range communication circuit, a wireless-fidelity (Wi-Fi) communication circuit, or the like), or a wired communication circuit (e.g., a local area network (LAN) communication circuit, a wide area network (WAN) communication circuit, an Ethernet communication circuit, a power line communication circuit, or the like).

The service platform server 100 may implement a service platform, for example, a vehicle lab platform, a vehicle emotional design platform (or a virtual sound design platform), and/or the like in a metaverse-based virtual environment. The vehicle lab platform may support content activities such as a vehicle disassembly and assembly academy, driving education in a virtual environment, a racing car, a driver test, and/or a driving sound design in a virtual environment. The vehicle emotional design platform may support to create (or design) a virtual sound, such as an electronic sound, a warning sound, a driving sound, and an engine sound, by developing emotional content with smart healing concept and designing a virtual environment sound in conjunction with a metaverse and a non-fungible token (NFT) blockchain.

The service platform server 100 may transmit information such as member information of a user (i.e., an individual member) who subscribes to the vehicle lab platform implemented in the virtual environment, a creative sound (or auctionable content), and/or a point (or a virtual cache capable of being replaced with a token) to the blockchain platform server 110. The member information is information for identifying a user, and the creative sound is a virtual sound designed by the user.

The service platform server 100 may assign one virtual vehicle to each of users in the virtual environment (i.e., the vehicle lab platform) to provide a token (or point) depending on content activity, thus supporting to level up a vehicle design, power, and/or function. The content activity may be a vehicle disassembly and assembly academy, driving education in a virtual environment, a racing car, a driver test, a driving sound design in a virtual environment, and/or the like.

The service platform server 100 may provide a sound design tool through the virtual sound design platform. The user may access the virtual sound design platform through the user device 120 to use the sound design tool.

The service platform server 100 may provide a racing car-based play culture on the vehicle lab platform, may enable an ultra-realistic sound design to provide an ultra-realistic sound, and may develop personalization technology.

The blockchain platform server 110 may support the vehicle lab platform and may be compatible with the service platform server 100. The blockchain platform server 110 may receive the information such as the member information of the user, the creative sound, and/or the point from the service platform server 100 and may encrypt the pieces of received information using a blockchain technology.

The blockchain platform server 110 may maintain transparent transaction details using a distributed ledger technology (DLT). The blockchain platform server 110 may include a token generator, a data management device, a metamask cryptocurrency transaction device to collect, sell, or share creative content (e.g., a creative sound, an electronic sound, a warning sound, a virtual sound, or the like) based on a virtual world token (e.g., an NFT). The token generator may create (or generate) an NFT linked to content (e.g., a creative sound or the like) requested by the user device 120. The token generator may generate an NFT based on information such as the member information of the user, the creative sound, and/or a point, which is transmitted from the service platform server 100. The data management device may manage an asset to the user. The metamask cryptocurrency transaction device may store, transact, and manage cryptocurrency using a metamask.

The blockchain platform server 110 may transmit data such as a metamask (which is a bankbook concept and is used for a cryptocurrency transaction), auction data information (based on the DLT), and/or a token (i.e., cryptocurrency capable of being replaced with a point) to the service platform server 100.

The blockchain platform server 110 may support to be linked with the service platform server 100 to perform a content transaction in an NFT-based market place in the virtual environment.

The user device 120 may be an electronic device used by a user who subscribes to the vehicle lab platform constructed by the service platform server 100. Herein, the user may be a virtual vehicle driver and/or an actual vehicle driver. The user device 120 may be an audio video navigation (AVN) device, a smartphone, a tablet, a laptop, a computer, or the like. Only one user device 120 is illustrated in the drawing, but not limited thereto. The user device 120 may be composed of two or more user devices 120.

Figure 2:
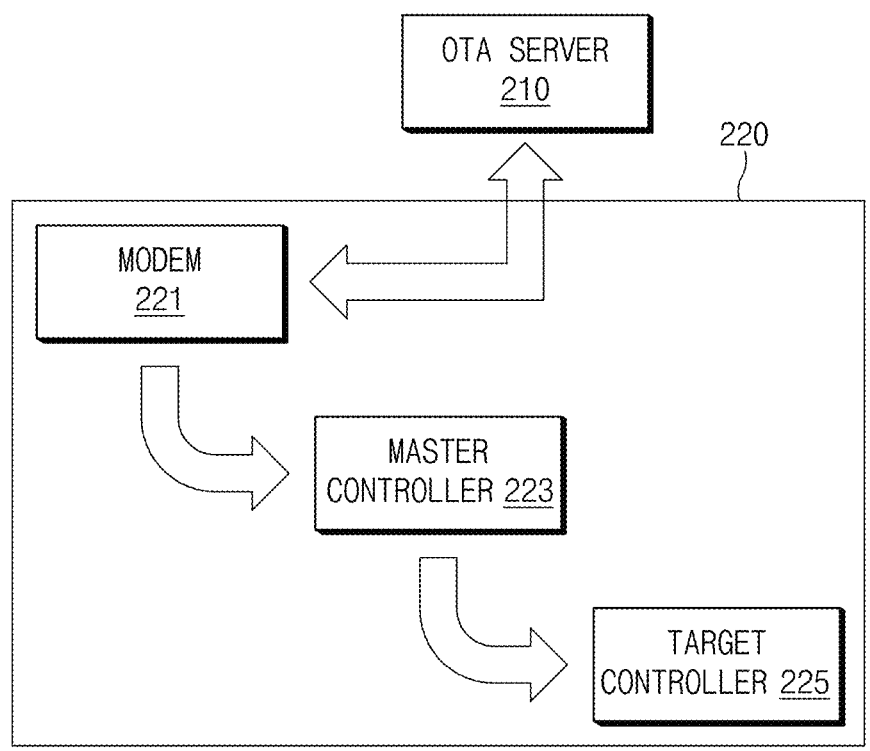
FIG. 2 is a block diagram illustrating a configuration of an OTA service system in a vehicle environment according to embodiments of present disclosure.

FIG. 2 is a block diagram illustrating a configuration of an OTA service system in a vehicle environment according to embodiments of present disclosure.

An OTA service system 200 may include an OTA server (hereinafter referred to as a "server") 210 and a vehicle 220, which are connected with each other over a wireless (i.e., OTA) network.

The server 210 may support to perform wireless communication between the server 210 and the vehicle 220. Although not illustrated in the drawing, the server 210 may include a processor, a memory, and a communication circuit.

The server 210 may perform a ready operation for user approval and OTA communication depending to the request of the vehicle 220. The server 210 may set priorities of a vehicle regulation sound (except for a virtual engine sound) and/or a warning sound to be higher than a virtual environment OTA sound. When the OTA communication ready operation is completed, the server 210 may proceed with updating a controller (e.g., a target controller 225 or the like) loaded into the vehicle 220 and may provide a notification of update progress situation and completion.

The vehicle 220 may include a modem 221, a master controller 223, and the target controller 225.

The modem 221 may support wireless communication between the server 210 and the vehicle 220. The modem 221 may support to perform OTA communication.

The master controller 223 may be a central communication unit (CCU), that is, a vehicle communication control device, which manages wired communication and wireless communication in an integrated manner. The master controller 223 may perform a controller information collection function, a package download function, and an integrity check function by means of the modem 221.

In detail, the master controller 223 may access the server 210 by means of the modem 221 to determine whether there is a need for an update for each controller. The master controller 223 may download a package matched with a controller which requires an update from the server 210 by means of the modem 221. The master controller 223 may perform an integrity check for the downloaded package. The master controller 223 may transmit the package passing through the integrity check to the target controller 225 in the background.

The target controller 225 may be a domain control unit (DCU), which may include a wireless communication modem. The target controller 225 may perform an update in cooperation with the master controller 223. The master controller 223 may transmit a program for update to the target controller 225 in the background. When the transmission in the background is completed, the master controller 223 may instruct the target controller 225 to proceed with an update. The target controller 225 may proceed with the update under the instruction of the master controller 223.

Figure 3:
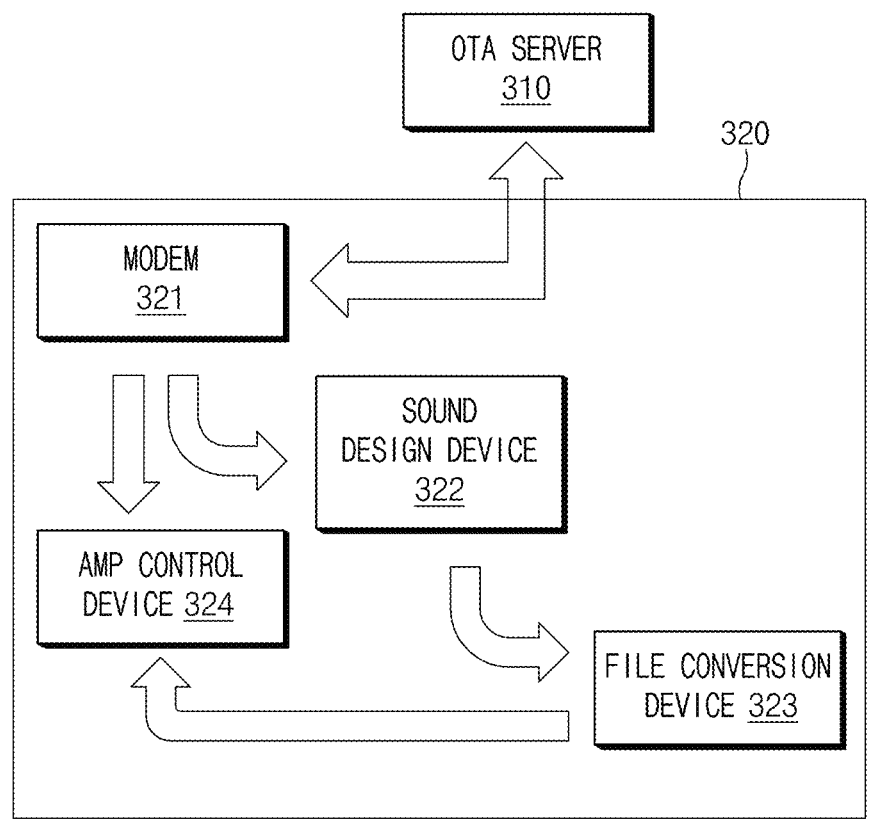
FIG. 3 is a block diagram illustrating a configuration of an OTA service system in a virtual environment according to embodiments of present disclosure.

FIG. 3 is a block diagram illustrating a configuration of an OTA service system in a virtual environment according to embodiments of present disclosure.

An OTA service system 300 may support to perform wireless communication between an OTA server (hereinafter referred to as a "server") 310 and a user device 320 (corresponding to a user device 120 shown in FIG. 1). Although not illustrated in the drawing, the server 310 may include a processor, a memory, and a communication circuit.

The user device 320 may include a modem 321, a sound design device 322, a file conversion device 323, and an AMP control device 324.

The modem 321 may support the user device 320 to perform wireless network communication with the server 310. The modem 321 may download a sound source file (e.g., a WAV file) through the server 310.

The sound design device 322 may create a sound desired by a user, for example, a driving sound, a warning sound, and/or an electronic sound, using a sound design creation program. The sound design device 322 may output a sound file created by the sound design creation program.

The file conversion device 323 may convert a sound file output from the sound design device 322 into a predetermined file format and may export the converted sound file. The predetermined file format may be a file format capable of being shared between a virtual environment and a vehicle environment (or a real world), which may be set a pulse code modulation (PCM) file. For example, the file conversion device 323 may convert a WAV file into a PCM file including a parameter characteristic using a conversion program.

The AMP control device 324 may receive the sound source file transmitted from the modem 321 or the file conversion device 323. The AMP control device 324 may play and output the received sound source file through the speaker.

The AMP control device 324 may control a sound output based on a sound parameter (or a controller area network (CAN) signal). The sound parameter may include volume, an accelerator position sensor (APS) value (or an accelerator pedal opening amount or accelerator pedal responsiveness), and the like. As an example, the AMP control device 324 may adjust volume in three levels such as "low," "normal," and "high." The AMP control device 324 may adjust sound volume to −3 dB, when the volume is set to being "low," may adjust the sound volume to +3 dB, when the volume is set to being "high," and may adjust the sound volume to 0 dB, when the volume is set to being "normal." As another example, the AMP control device 324 may change a sound in three levels depending on the accelerator pedal responsiveness, that is, being "slow," "normal," and "fast."

The sound design device 322, the file conversion device 323, and the AMP control device 324 may be respectively implemented as programs executed by a processor (not shown) of the user device 320.

Figure 4A:
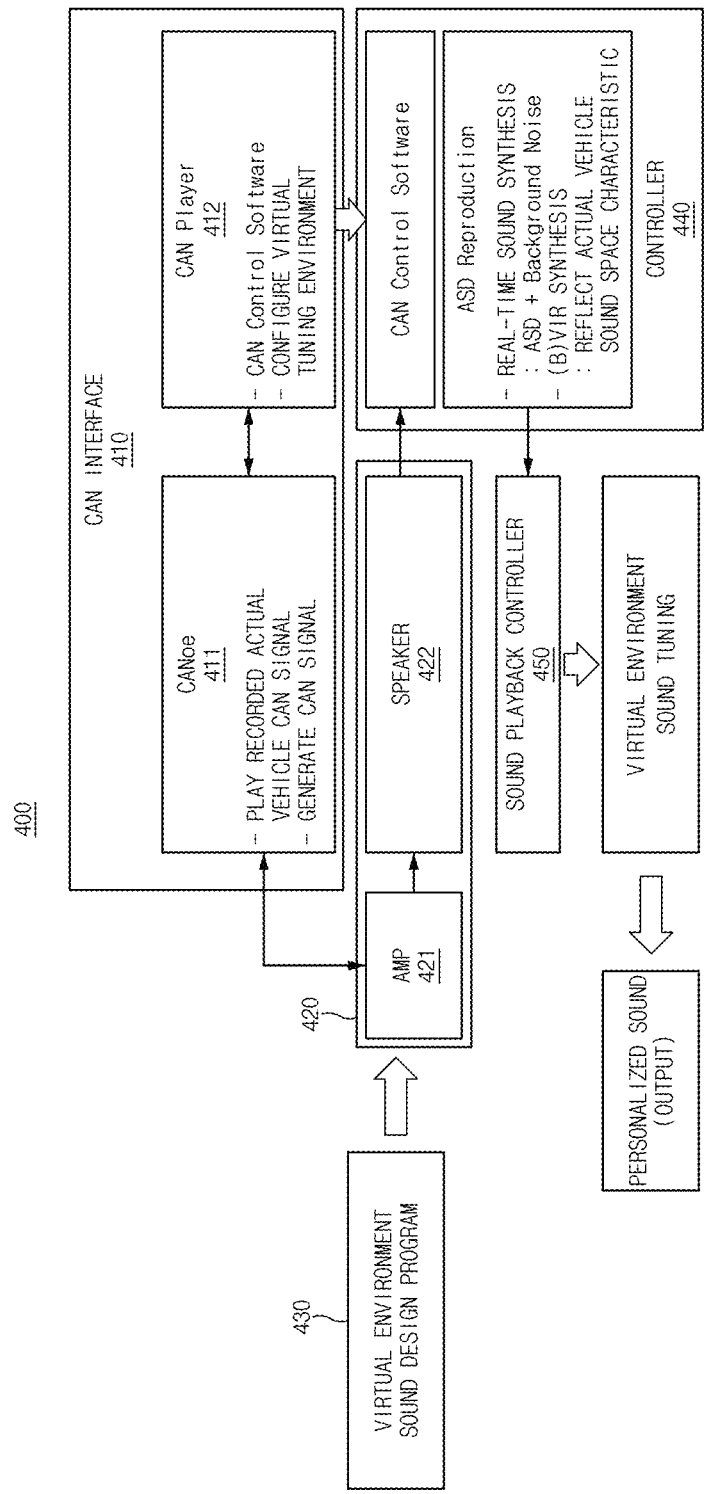
FIG. 4A is a drawing illustrating a configuration of a virtual environment sound tuning simulator according to embodiments of the present disclosure.
Figure 4B:
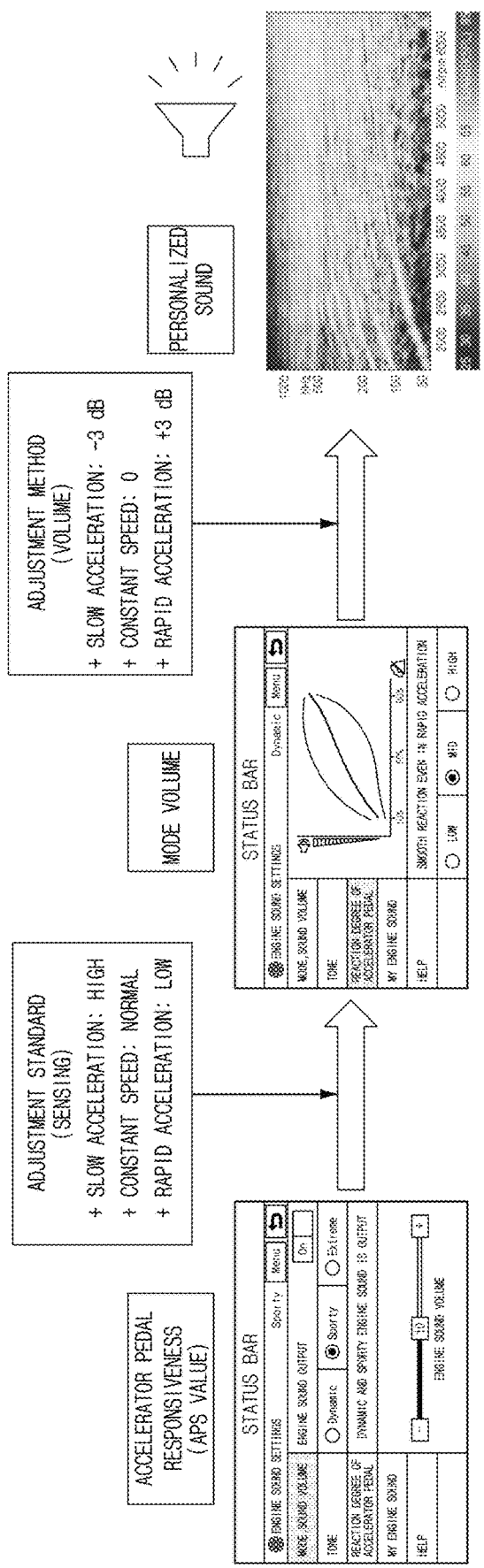
FIG. 4B is a drawing illustrating an example of tuning a sound according to embodiments of the present disclosure.

FIG. 4A is a drawing illustrating a configuration of a virtual environment sound tuning simulator according to embodiments of the present disclosure. FIG. 4B is a drawing illustrating an example of tuning a sound according to embodiments of the present disclosure.

A virtual environment sound tuning simulator 400 may perform virtual environment sound turning using active sound design hardware in loop simulation (ASD HiLS). The virtual environment sound tuning simulator 400 may include a CAN interface 410, an ASD system 420, a sound design program 430, a controller 440, and a sound playback controller 450.

The CAN interface 410 may record, play, generate, or transmit and receive actual vehicle driving information between the respective devices. In other words, the CAN interface 410 may be a CAN signal transceiver (or transmitter), which may transmit a CAN signal, collected from an actual vehicle, to the ASD system 420 and the controller 440. The CAN interface 410 may generate a CAN signal including a parameter calculated by the virtual environment sound tuning simulator 400 and may transmit the generated CAN signal to the ASD system 420.

The CAN interface 410 may include a controller area network open environment (CANoe) 411 and a CAN player 412, which may play the same signal as the vehicle or may manipulate the obtained signal using a CAN signal obtained in the vehicle and may transmit and receive the CAN signal therebetween.

The ASD system 420 may include an AMP 421 and a speaker 422.

The AMP 421 may receive a tuning parameter of the sound design program 430. The AMP 421 may calculate an output value according to the turning parameter and the CAN signal. The AMP 421 may generate and/or amplify an ASD sound based on the calculated output value.

The speaker 422 may play and output the ASD sound output from the AMP 421.

The sound design program 430 may provide a level similar to the real world, that is, the vehicle environment to allow the user to safely and conveniently develop a sound.

The controller 440 may perform the overall operation of the virtual environment sound tuning simulator 400 and may store and manage default interior sound data generated by recording a noise, vibration, harshness (NVH) sound of the actual vehicle. The controller 440 may store and manage sound field characteristic information (e.g., a binaural vehicle impulse response (BVIR)) from a sound source (e.g., a speaker) in the actual vehicle to ears of a person in terms of spatial sound and may generate, collect, and process a CAN signal capable of identifying an operation state of the vehicle.

The controller 440 may synthesize a sound (e.g., background noise) recorded in the actual vehicle with the played ASD sound to generate a composite sound. Furthermore, the controller 440 may reflect an actual vehicle sound space characteristic, that is, BVIR information in the generated composite sound to generate a final composite sound.

The sound playback controller 450 may output the final composite sound. In other words, the sound playback controller 450 may perform sound tuning of the final composite sound in a virtual environment. The sound playback controller 450 may synthesize or separate the ASD sound played by the ASD system 420 with (or from) the actual vehicle sound stored in the controller 440.

The controller 440 may allow a user to listen to the tuned sound using a VR simulator which simulates a virtual driving environment and may perform a verification procedure by means of hearing experience feedback on the tuned sound. The controller 440 may repeatedly perform verification of the tuned sound and sound tuning based on the verified result to provide hearing experience of an actual vehicle level. The VR simulator may play the final sound and may provide the same level as the actual vehicle.

Referring to FIG. 4B, the sound playback controller 450 may adjust sound volume depending on an APS value (or accelerator pedal responsiveness). The standard for adjusting the accelerator pedal responsiveness may be automatically set to "high slow acceleration," "normal constant speed," or "low rapid acceleration" by sensing driving habits of the user or may be directly set by the user. The sound playback controller 450 may adjust volume to −3 dB in a slow acceleration condition, may adjust volume to 0 dB in a constant speed condition, and may adjust volume to +3 dB in a rapid acceleration condition. When sound volume is adjusted according to an APS value in a virtual environment, an adjustment standard and an adjustment method may differ slightly depending on individual driving habits and hearing sensitivity.

Figure 5A:
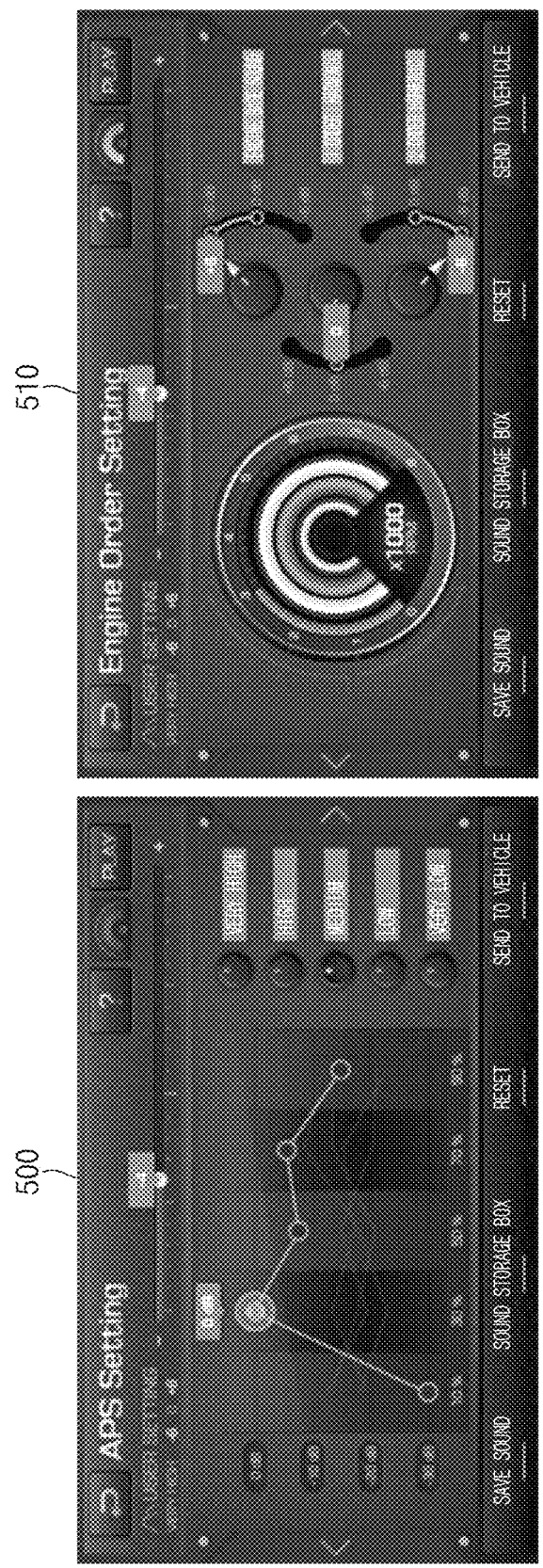
FIG. 5A and FIG. 5B are drawings illustrating a virtual environment sound design platform according to embodiments of the present disclosure.
Figure 5B:
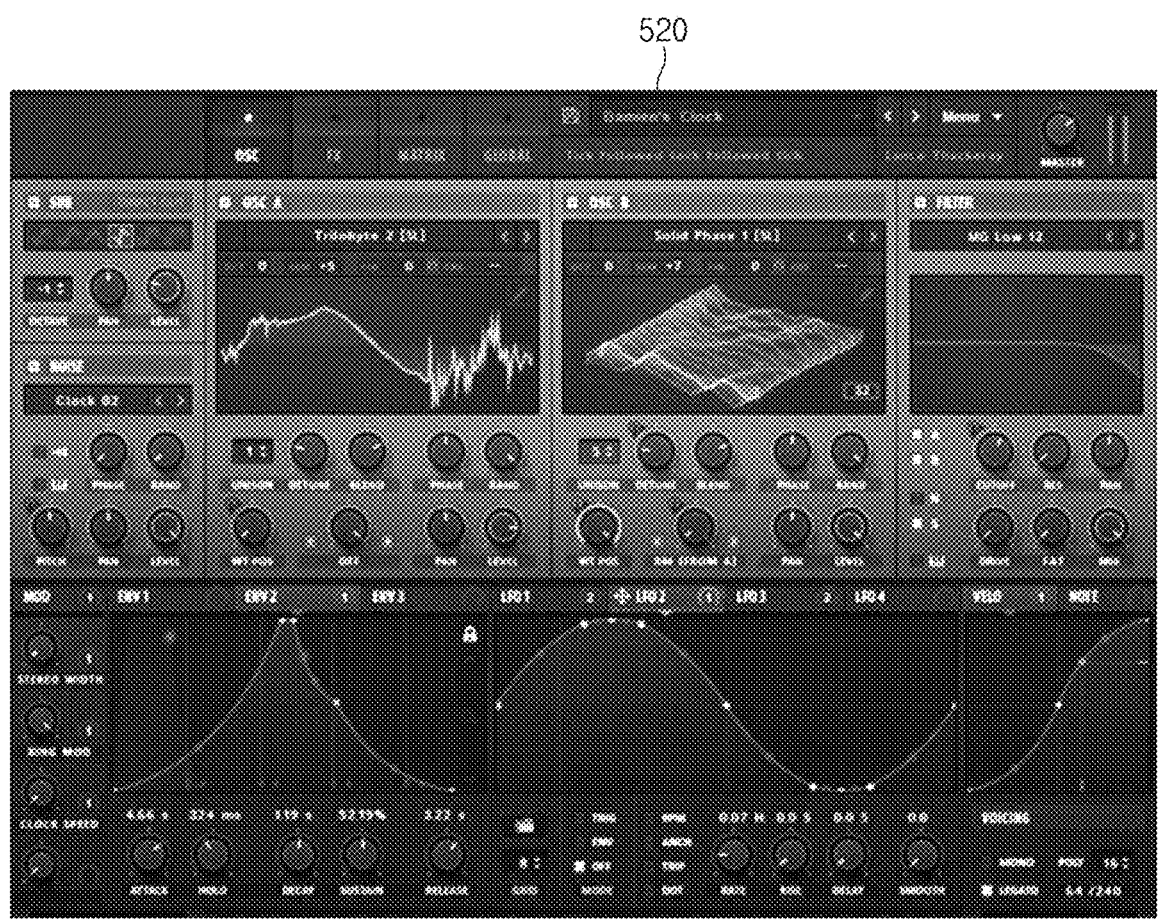

FIG. 5A and FIG. 5B are drawings illustrating a virtual environment sound design platform according to embodiments of the present disclosure.

A service platform server 100 of FIG. 1 may provide a user device 120 of FIG. 1 with sound design platforms 500 and 510 for general user, for allowing a general user to simply design a sound. The user device 120 may output the APS setting platform 500, the engine order setting platform 510, and the like transmitted from the service platform server 100 on a screen. The user may adjust APS resistance in the APS setting platform 500 and may adjust engine sound volume according to an engine order in the engine order setting platform 510.

Furthermore, the service platform server 100 may provide a sound design platform 520 for expert. An expert may adjust a sound in more detail to create a virtual sound in the sound design platform 520.

Figure 6:
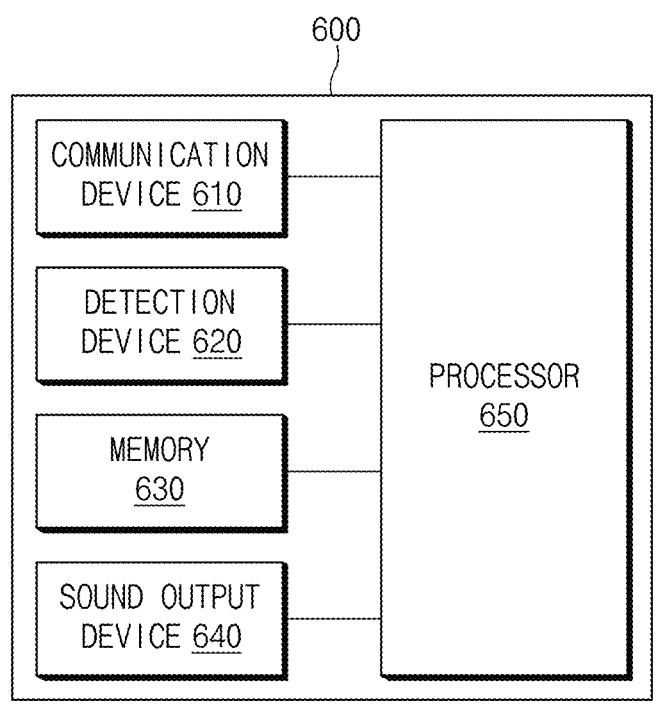
FIG. 6 is a block diagram illustrating a configuration of a sound processing device according to embodiments of the present disclosure.

FIG. 6 is a block diagram illustrating a configuration of a sound processing device according to embodiments of the present disclosure.

A sound processing device 600 may be an electronic device mounted on a vehicle, which may be a user device 120 shown in FIG. 1 or a target controller 225 or the like shown in FIG. 2. As shown in FIG. 6, the sound processing device 600 may include a communication device 610, a detection device 620, a memory 630, a sound output device 640, and a processor 650.

The communication device 610 may support the sound processing device 600 to communicate with electronic control units (ECUs) mounted on the vehicle. The communication device 610 may include a transceiver which transmits and receives a CAN message using a CAN protocol. The communication device 610 may support the sound processing device 600 to communicate with an external electronic device (e.g., a terminal, a server, and the like). The communication device 610 may include a wireless communication circuit, a wired communication circuit, and/or the like.

The detection device 620 may detect vehicle information, for example, driving information, environmental information inside and outside the vehicle, and/or the like. The detection device 620 may detect vehicle information, such as a vehicle speed, a motor revolution per minute (RPM), an accelerator pedal opening amount, a throttle opening amount, a vehicle interior temperature, and/or a vehicle exterior temperature, using at least one sensor and/or at least one electronic control unit (ECU), which are/is mounted on the vehicle. An accelerator position sensor (APS), a throttle position sensor, a global positioning system (GPS) sensor, a wheel speed sensor, a temperature sensor, a microphone, an image sensor, an advanced driver assistance system (ADAS) sensor, a 3-axis accelerometer, an inertial measurement unit (IMU), and/or the like may be used as the at least one sensor. The at least one ECU may be a motor control unit (MCU), a vehicle control unit (VCU), and/or the like.

The memory 630 may store a sound source (or a sound source file) such as a driving sound, a virtual sound, and/or a warning sound. The memory 630 may store a virtual sound design algorithm, a volume setting algorithm, volume control logic, sound equalizer logic, and/or the like.

The memory 630 may be a non-transitory memory which stores instructions executed by the processor 650. The memory 630 may include at least one of storage media such as a random access memory (RAM), a static RAM (SRAM), a read only memory (ROM), a programmable ROM (PROM), an electrically erasable and programmable ROM (EEPROM), an erasable and programmable ROM (EPROM), a hard disk drive (HDD), a solid state disk (SSD), an embedded multimedia card (eMMC), universal flash storage (UFS), or web storage.

The sound output device 640 may play and output a sound source which is previously stored or is streamed in real time to the outside. The sound output device 640 may include an amplifier, a speaker, and/or the like. The amplifier may amplify an electrical signal of a music sound played from the sound output device 640. A plurality of speakers may be installed at different locations inside and/or outside the vehicle. The speaker may convert the electrical signal amplified by the amplifier into a sound wave.

The processor 650 may be electrically connected with the respective components 610 to 640. The processor 650 may include at least one of processing devices such as an application specific integrated circuit (ASIC), a digital signal processor (DSP), programmable logic devices (PLD), field programmable gate arrays (FPGAs), a central processing unit (CPU), microcontrollers, or microprocessors.

The processor 650 may detect manipulation of a driver by means of the detection device 620. The processor 650 may control a sound mode depending on the manipulation of the driver. For example, the processor 650 may turn on or off a soundscape mode depending on the manipulation of the driver.

The processor 650 may obtain an internal input signal parameter (i.e., CAN information) and/or an external input signal parameter (e.g., GPS information) by means of the detection device 620. The internal input signal parameter may include a temperature, a pedal opening amount, a speed, a throttle opening amount, and/or the like. The external input signal parameter may include a temperature, a speed measured by the GPS, and/or the like. The processor 650 may generate a virtual sound based on the vehicle information, that is, the internal input signal parameter and/or the external input signal parameter, which is obtained by the detection device 620. When generating the virtual sound, the processor 650 may adjust volume, timbre, a sound output time point, and/or the like of the virtual sound. The processor 650 may transmit the generated virtual sound to the sound output device 640. The sound output device 640 may play and output the generated virtual sound under an instruction of the processor 650.

The processor 650 may receive a virtual sound (e.g., an engine sound, an acceleration sound, a warning sound, a turn signal sound, a notification sound, or the like) generated in the virtual environment through the communication device 610. The processor 650 may connect a virtual environment with a vehicle environment based on OTA to download a virtual sound generated in the virtual environment. The processor 650 may store the downloaded virtual sound in a specified location in the memory 630.

The processor 650 may adjust (or process) the virtual sound stored in the memory 630 based on the vehicle information obtained by the detection device 620 while driving. The processor 650 may transmit the adjusted virtual sound to the sound output device 640 to play and output the virtual sound.

Figure 7:
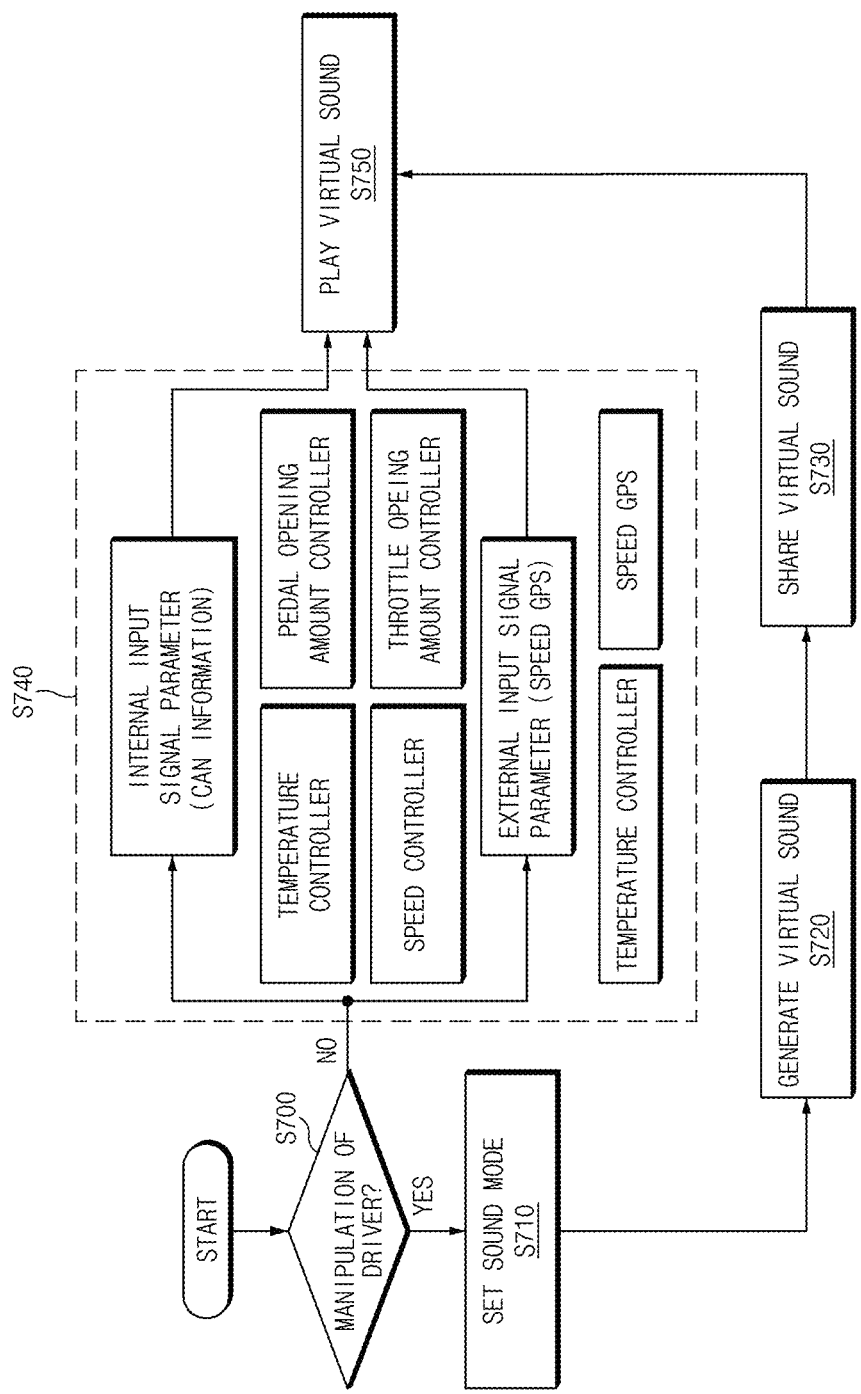
FIG. 7 is a flowchart illustrating a sound processing method according to embodiments of the present disclosure.

FIG. 7 is a flowchart illustrating a sound processing method according to embodiments of the present disclosure.

In S700, a sound processing device 600 of a vehicle may detect manipulation of a driver of the vehicle.

In S710, the sound processing device 600 may turn on or off a soundscape mode depending on the detected manipulation of the driver.

In S720, the sound processing device 600 may access a service platform provided by a service platform server 100 of FIG. 1 to generate a virtual sound. The sound processing device 600 may generate a virtual sound (e.g., a driving sound, a warning sound, a notification sound, or the like) using sound design content in a metaverse-based service platform (i.e., a virtual environment).

In S730, the sound processing device 600 may share the generated virtual sound. The sound processing device 600 may apply the virtual sound generated in the virtual environment to a vehicle environment using OTA. The sound processing device 600 may download a virtual sound from the service platform server 100. The sound processing device 600 may store the downloaded virtual sound in a specified location in a memory 630 of FIG. 6. In other words, the sound processing device 600 may load the virtual sound generated in the virtual environment into a vehicle in a real world.

When the manipulation of the driver is not detected in S700, in S740, the sound processing device 600 may obtain an internal input signal parameter and/or an external input signal parameter by means of a detection device 620 of FIG. 2.

In S750, the sound processing device 600 may play the virtual sound based on the vehicle information obtained by the detection device 620 while driving. The sound processing device 600 may control a sound output device 640 of FIG. 6 to adjust the output of the virtual sound based on the obtained internal input signal parameter and/or the obtained external input signal parameter.

Figure 8:
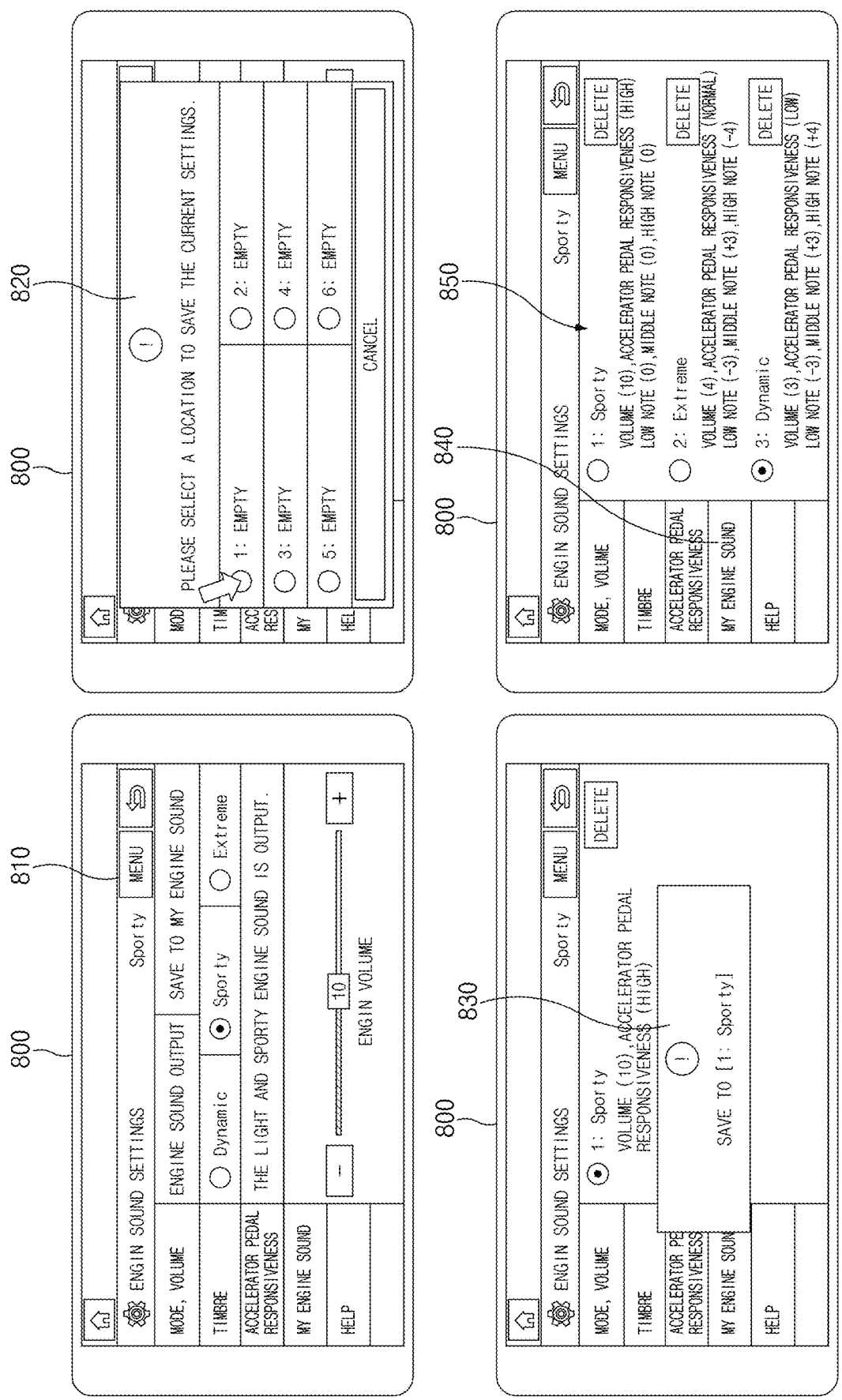
FIG. 8 is a drawing for describing a process of loading a virtual sound into a vehicle environment according to embodiments of the present disclosure.

FIG. 8 is a drawing for describing a process of loading a virtual sound into a vehicle environment according to embodiments of the present disclosure.

A sound processing device 600 of FIG. 6 may select a menu 810 on an engine sound setting screen 800 depending on the user input and may select the "Save to my Engine Sound" item in a sub-menu.

When the "Save to my Engine Sound" item is selected, the sound processing device 600 may output a pop-up window 820 for selecting a sound storage location on the engine sound setting screen 800. When the storage location is selected on the pop-up window 820, the sound processing device 600 may store an engine sound designed by the user in the selected location. When the storage of the engine sound is completed, the sound processing device 600 may output a notification pop-up window 830.

Thereafter, when the "my engine sound" menu 840 is selected on the engine sound setting screen 800, the sound processing device 600 may identify the stored engine sound list 850. The sound processing device 600 may delete a sound selected by the user in the engine sound list 850.

Figure 9:
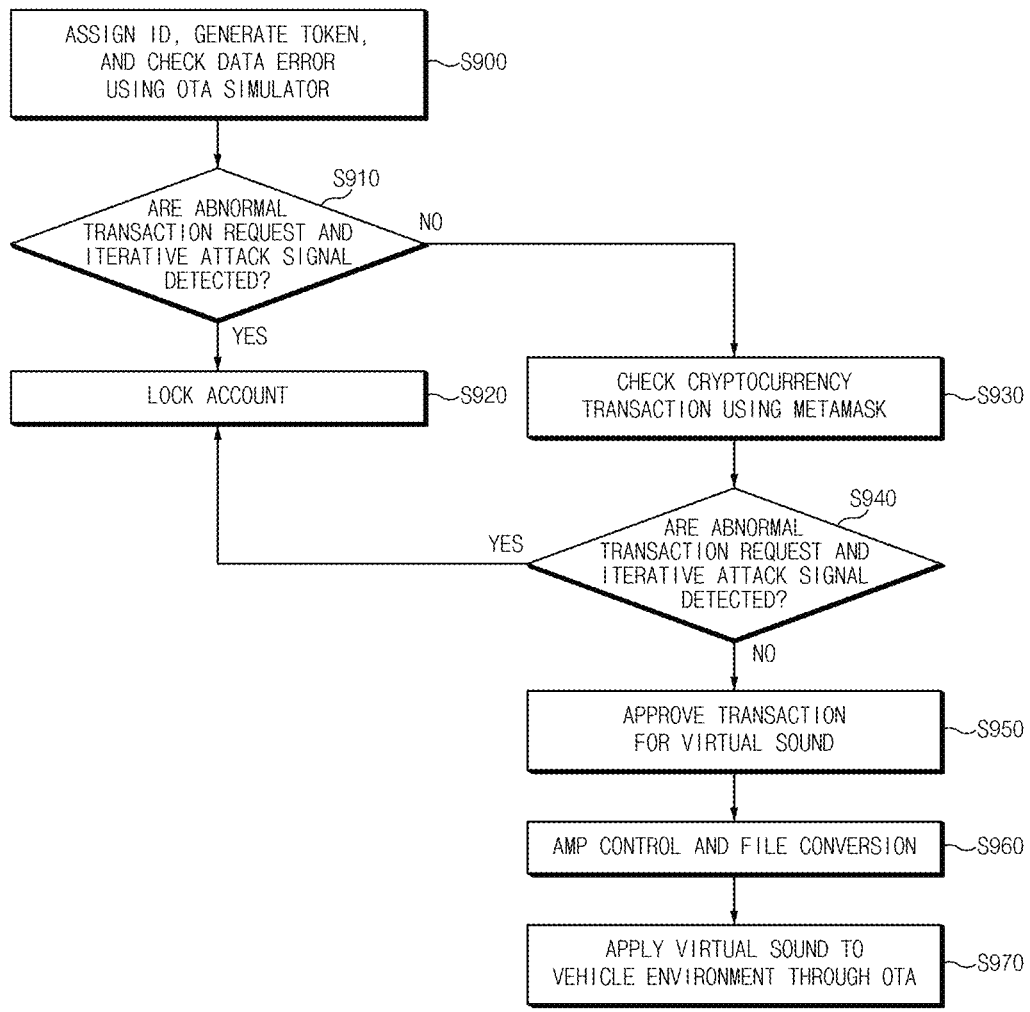
FIG. 9 is a flowchart illustrating a security method in a virtual environment according to embodiments of the present disclosure.

FIG. 9 is a flowchart illustrating a security method in a virtual environment according to embodiments of the present disclosure.

In the present embodiment, a process to detect an abnormal transaction request or an iterative attack signal, which is capable of being generated in a virtual environment, to prevent security and bug programs may be presented.

In S900, a blockchain platform server 110 of FIG. 1 may perform a function of assigning an ID, generating a token, and checking a data error using an OTA simulator (e.g., a PYTHON-based OTA simulator). The blockchain platform server 110 may issue an ID depending on the request of a user device 120 of FIG. 1 and may perform token generation, a data error check, and the like.

In S910, the blockchain platform server 110 may determine whether the abnormal transaction request and the iterative attack signal are detected.

When it is determined that the abnormal transaction request and the iterative attack signal are detected, in S920, the blockchain platform server 110 may lock an issued account. The blockchain platform server 110 may impose a penalty when applying for account reissuance. For example, the blockchain platform server 110 may impose a penalty when applying for account reissuance once and may cancel the account reissuance when applying for account reissuance twice.

When it is determined that the abnormal transaction request and the iterative attack signal are not detected, in S930, the blockchain platform server 110 may check a cryptocurrency transaction using the metamask. The blockchain platform server 110 may perform a metamask cryptocurrency transaction for a virtual sound won through an auction process by the service platform server 100.

In S940, the blockchain platform server 110 may determine whether the abnormal transaction request and the iterative attack signal are detected.

When it is determined that the abnormal transaction request and the iterative attack signal are detected in S940, in S920, the blockchain platform server 110 may lock the account.

When it is determined that the abnormal transaction request and the iterative attack signal are not detected in S940, in S950, the blockchain platform server 110 may approve the transaction for the virtual sound. The blockchain platform server 110 may assign a token matched with the virtual sound to an ID of a user who transacted (or won) the virtual sound.

In S960, the blockchain platform server 110 may perform AMP control and file export after approving the transaction.

In S970, the blockchain platform server 110 may apply the virtual sound to a vehicle environment through OTA. The blockchain platform server 110 may prepare for wireless communication with an OTA server using a modem. The blockchain platform server 110 may load the virtual sound into the vehicle of the user by means of the OTA server.

Figure 10:
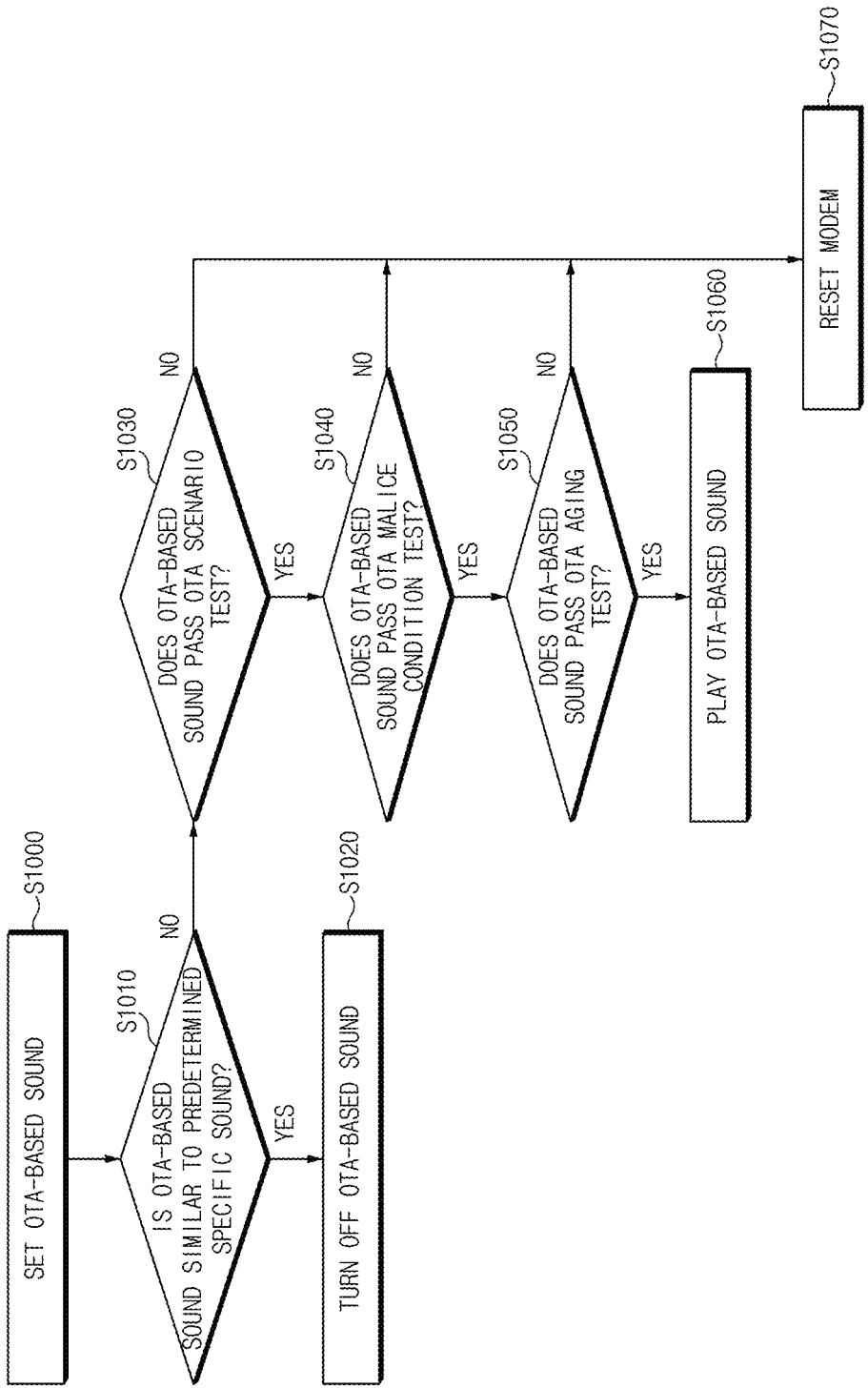
FIG. 10 is a flowchart illustrating a security method in a vehicle environment according to embodiments of the present disclosure.

FIG. 10 is a flowchart illustrating a security method in a vehicle environment according to embodiments of the present disclosure.

The present embodiment may prevent a situation that may cause confusion with a vehicle regulation sound and/or a warning sound capable of occurring in a vehicle environment and may present a robust process through an OTA version and vehicle suitability, a robust design for an abnormal situation, and countermeasures considering dispersion of an environmental condition.

In S1000, a vehicle communication control device (e.g., a master controller 223 of FIG. 2) may set an OTA-based sound. The vehicle communication control device may perform preparation for downloading a virtual sound through wireless communication with an OTA server 210 of FIG. 2. In other words, the vehicle communication control device may turn on a function of downloading and using the virtual sound from the OTA server 210.

In S1010, the vehicle communication control device may determine whether the set OTA-based sound is similar to a predetermined specific sound. The predetermined specific sound may include at least one of the vehicle regulation sound or the warning sound. When the similarity between the OTA-based sound and the predetermined specific sound is greater than or equal to a reference value (e.g., 90%), the vehicle communication control device may determine whether the OTA-based sound is similar to the predetermined specific sound. Meanwhile, when the similarity between the OTA-based sound and the predetermined specific sound is less than the reference value, the vehicle communication control device may determine whether the OTA-based sound is not similar to the predetermined specific sound.

When the set OTA-based sound is similar to the vehicle regulation sound and the warning sound, in S1020, the vehicle communication control device may turn off the OTA-based sound (or an OTA-based sound playback function). The vehicle communication control device may limit the use of the virtual sound received through OTA.

When the set OTA-based sound is not similar to the vehicle regulation sound and the warning sound, in S1030, the vehicle communication control device may determine whether the OTA-based sound passes an OTA scenario test. The vehicle communication control device may demonstrate a normal program, may check volume of a vehicle speaker, and may test an OTA version, vehicle suitability, and the like.

When it is determined that the OTA-based sound passes the OTA scenario test, in S1040, the vehicle communication control device may determine whether the OTA-based sound passes an OTA malice condition test. The vehicle communication control device may check whether a backup is possible when power is stopped, whether it is possible to prevent impact damage, whether it is possible to restore an original state when a bug occurs.

When it is determined that the OTA-based sound passes the OTA malice condition test, in S1050, the vehicle communication control device may determine whether the OTA-based sound passes an OTA aging test. The vehicle communication control device may check whether the OTA-based sound is within limits when an iterative task is performed, within high-temperature, low-temperature, and ultraviolet limits, within salinity and humidity limits, or the like.

When it is determined that the OTA-based sound passes the OTA aging test, in S1060, the vehicle communication control device may play the OTA-based sound. When the OTA-based sound passes the OTA aging test, the vehicle communication control device may transmit the OTA-based sound, that is, the virtual sound to a sound processing device 600 of FIG. 6. The sound processing device 600 may process the output of the virtual sound based on the driving situation of the vehicle and may play and output the processed virtual sound through the speaker.

When it is determined that the OTA-based sound does not pass the test in S1030, S1040, or S1050, in S1070, the vehicle communication control device may reset a modem 221 of FIG. 2. The vehicle communication control device may restore a normal mode by resetting the model and may output a notification (e.g., a message or the like) indicating that it is impossible to set personalization OTA.

Embodiments of the present disclosure may tune a virtual sound in an NFT blockchain-based virtual environment, thus responding to the emotional quality of the user.

Furthermore, embodiments of the present disclosure may connect the virtual sound in the NFT blockchain-based virtual environment with a real world using OTA to control the virtual sound, thus creating and sharing the virtual sound, such as an electronic sound, a warning sound, an engine sound, and a driving sound, by means of a virtual environment sound design.

Furthermore, embodiments of the present disclosure may check a transaction for a virtual sound based on OTA and may verify the virtual sound through an OTA state test.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A sound system using over-the-air (OTA), the sound system comprising:
    a blockchain platform server configured to support performance of a virtual sound transaction in a virtual environment;
    an OTA server configured to manage a virtual sound transmitted from the blockchain platform server; and
    a vehicle communication control device configured to perform wireless communication with the OTA server, wherein the vehicle communication control device is configured to:

download the virtual sound from the OTA server;
determine that a similarity between the virtual sound and a predetermined specific sound is less than a reference value;
in response to the similarity between the virtual sound and the predetermined specific sound being less than the reference value, perform an OTA state test of the virtual sound, wherein the OTA state test is performed to determine whether the vehicle communication control device encounters an abnormal situation; and
control a sound processing device to play the virtual sound when the virtual sound passes the OTA state test.

2. The sound system of claim 1, wherein the blockchain platform server is configured to:
check a system of the blockchain platform server using an OTA simulator to verify that there is no abnormality in the system;
check a cryptocurrency transaction for the virtual sound using a metamask when there is no abnormality in the system;
determine whether an abnormal transaction request and an iterative attack signal are detected in a process of performing the cryptocurrency transaction;
approve the cryptocurrency transaction in response to determining that the abnormal transaction request and the iterative attack signal are not detected in the process of performing the cryptocurrency transaction;
perform output control and file format conversion of the virtual sound, the cryptocurrency transaction of which is approved; and
transmit the virtual sound, a file format of which is converted, to the OTA server.

3. The sound system of claim 2, wherein the blockchain platform server is configured to perform ID assignment, token generation, and a data error check using the OTA simulator and to identify whether the abnormal transaction request and the iterative attack signal are detected.

4. The sound system of claim 2, wherein the blockchain platform server is configured to convert a file format of the virtual sound into a pulse code modulation (PCM) file.

5. The sound system of claim 1, wherein the predetermined specific sound comprises a vehicle regulation sound or a warning sound.

6. The sound system of claim 1, wherein the vehicle communication control device is configured to perform one or more of an OTA scenario test, an OTA malice condition test, and an OTA aging test.

7. The sound system of claim 1, wherein the vehicle communication control device is configured to reset a modem when the virtual sound does not pass the OTA state test.

8. The sound system of claim 1, wherein the vehicle communication control device is configured to turn off an OTA-based sound playback function when the similarity is greater than or equal to the reference value.

9. The sound system of claim 1, wherein the sound processing device is configured to adjust one or more of a volume of the virtual sound, a timbre of the virtual sound, and a sound output time point of the virtual sound based on one or more of an internal input signal parameter and an external input signal parameter obtained by a detection device included in the sound processing device.

10. An operation method of a sound system using over-the-air (OTA), the operation method comprising:
transmitting, by a blockchain platform server, a virtual sound in a virtual environment to an OTA server;
downloading, by a vehicle communication control device, the virtual sound from the OTA server;
determining, by the vehicle communication control device, that a similarity between the virtual sound and a predetermined specific sound is less than a reference value;
performing, by the vehicle communication control device, in response to the similarity being lower than the reference value, an OTA state test of the virtual sound, wherein the OTA state test is performed to determine whether the vehicle communication control device encounters an abnormal situation; and
controlling, by the vehicle communication control device, a sound processing device to play the virtual sound when the virtual sound passes the OTA state test.

11. The operation method of claim 10, wherein the transmitting of the virtual sound to the OTA server includes:
checking, by the blockchain platform server, a system of the blockchain platform server using an OTA simulator to verify that there is no abnormality in the system;
checking, by the blockchain platform server, a cryptocurrency transaction for the virtual sound using a metamask when there is no abnormality in the system;
determining, by the blockchain platform server, whether an abnormal transaction request and an iterative attack signal are detected in a process of performing the cryptocurrency transaction;
approving, by the blockchain platform server, the cryptocurrency transaction in response to determining that the abnormal transaction request and the iterative attack signal are not detected in the process of performing the cryptocurrency transaction;
performing, by the blockchain platform server, output control and file format conversion of the virtual sound, the cryptocurrency transaction of which is approved; and
transmitting, by the blockchain platform server, the virtual sound, a file format of which is converted, to the OTA server.

12. The operation method of claim 11, wherein the checking of the system includes:
performing, by the blockchain platform server, ID assignment, token generation, and a data error check using the OTA simulator and identifying, by the blockchain platform server, whether the abnormal transaction request and the iterative attack signal are detected.

13. The operation method of claim 11, wherein the performing of the file format conversion comprises converting, by the blockchain platform server, a file format of the virtual sound into a PCM file.

14. The operation method of claim 10, wherein the predetermined specific sound comprises a vehicle regulation sound or a warning sound.

15. The operation method of claim 10, wherein the performing of the OTA state test comprises performing, by the vehicle communication control device, one or more of an OTA scenario test, an OTA malice condition test, and an OTA aging test.

16. The operation method of claim 10, further comprising resetting, by the vehicle communication control device, a modem when the virtual sound does not pass the OTA state test.

17. The operation method of claim 10, further comprising turning off, by the vehicle communication control device, an OTA-based sound playback function when the similarity is greater than or equal to the reference value.

18. The operation method of claim 10, further comprising:
obtaining, by the sound processing device, one or more parameters among an internal input signal parameter and an external input signal parameter by a detection device included in the sound processing device; and
adjusting, by the sound processing device, one or more of a volume of the virtual sound, a timbre of the virtual sound, and a sound output time point of the virtual sound based on one or more obtained parameters.

19. A sound system using over-the-air (OTA), the sound system comprising:
a blockchain platform server configured to support performance of a virtual sound transaction in a virtual environment;
an OTA server configured to manage a virtual sound transmitted from the blockchain platform server; and
a vehicle communication control device configured to perform wireless communication with the OTA server, wherein the vehicle communication control device is configured to:
download the virtual sound from the OTA server;
determine that a similarity between the virtual sound and a predetermined specific sound is less than a reference value;
turn off an OTA-based sound playback function in response to the similarity between the virtual sound and the predetermined specific sound being greater than or equal to the reference value;
perform an OTA state test of the virtual sound in response to the similarity between the virtual sound and the predetermined specific sound being less than the reference value; and
control a sound processing device to play the virtual sound when the virtual sound passes the OTA state test.

20. The sound system of claim 19, wherein the blockchain platform server is configured to:
check a system of the blockchain platform server using an OTA simulator to verify that there is no abnormality in the system;
check a cryptocurrency transaction for the virtual sound using a metamask when there is no abnormality in the system;
determine whether an abnormal transaction request and an iterative attack signal are detected in a process of performing the cryptocurrency transaction;
approve the cryptocurrency transaction in response to determining that the abnormal transaction request and the iterative attack signal are not detected in the process of performing the cryptocurrency transaction;
perform output control and file format conversion of the virtual sound, the cryptocurrency transaction of which is approved; and
transmit the virtual sound, a file format of which is converted, to the OTA server.

* * * * *